Oct. 12, 1965   A. M. McQUARRIE   3,212,006
LIGHT LOAD COMPENSATION DEVICE FOR POLYPHASE NETWORK METER
INCLUDING AN INDUCTOR WITH A SATURABLE FLUX PATH
Filed June 27, 1961   2 Sheets-Sheet 1

Inventor,
Alexander M. McQuarrie,
by Francis K. Doyle
His Attorney.

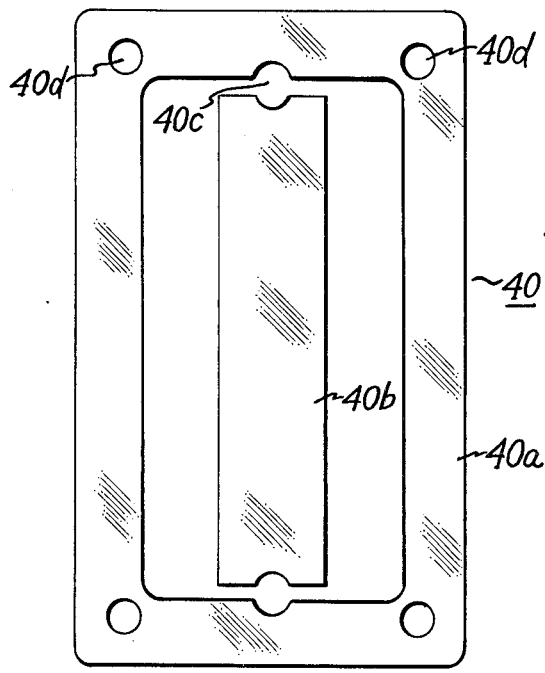
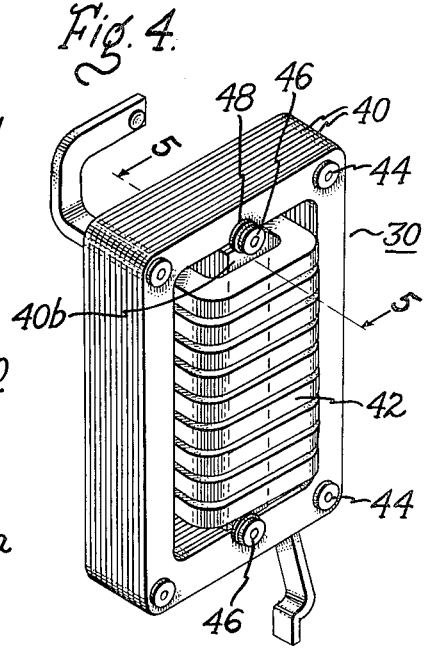
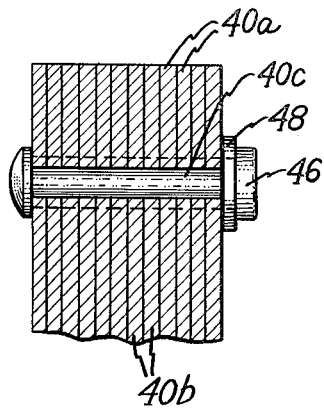

3,212,006
LIGHT LOAD COMPENSATION DEVICE FOR POLYPHASE NETWORK METER INCLUDING AN INDUCTOR WITH A SATURABLE FLUX PATH
Alexander M. McQuarrie, Rochester, N.H., assignor to General Electric Company, a corporation of New York
Filed June 27, 1961, Ser. No. 120,061
3 Claims. (Cl. 324—138)

This invention relates to a light load compensation device, and more particularly, to a light load compensation device for use in a network meter.

In many large cities, it is the practice to use three-phase four-wire systems of power distribution to provide the desired voltages for the various needs of the city. As is well known, a three-phase four-wire system will generally provide approximately 208 volts between the various phases of such system, and approximately 120 volts between any phase line and the neutral of such system. The 208 volt power is utilized to operate various large electrical devices, such as, electric stoves, air conditioners, and the like. The 120 volt power is generally used for various small appliances, such as, toasters, fans, and the like, and for the various lighting circuits.

Conventional single stator three-wire 120/240 volt single phase watthour meters cannot be used to accurately measure power consumption from a three-phase four-wire system. These meters will accurately measure the 208 volt, phase-to-phase power, but because the phase to neutral loads will be metered at a 30° phase displacement, which represents a power factor of 0.866 rather than unity, and the phase voltages are greater than one-half the line voltages, the meter will only register 75% of the value of the actual power used with phase to neutral loads.

To overcome this problem, a single stator network meter has been provided which will accurately measure both phase-to-phase power consumption, as well as phase-to-neutral power consumption. Such a meter is disclosed in application Serial No. 98,803, filed March 28, 1961, in the name of William H. Morong, Jr., John F. Scammon, and Clifton A. Clarke, Jr. now Patent 3,150,317. That application has been assigned to the same assignee as the present application. The single stator network meter of Patent 3,150,317 includes a single iron core reactor in parallel with one of the current coils to aid in providing the desired phase relation, as is clearly disclosed in that application.

While the meter disclosed in the aforementioned Patent 3,150,319 satisfactorily performs the desired measuring of power consumption, it has been discovered that the meter is generally slow at light loads. As will be understood, with a slow meter at light loads, the meter does not completely accurately register the full power consumption at such loads. Of course, this will result in the utility not being able to bill for all the power consumed by the customer. Clearly it is desirable to improve the light load accuracy of the meter, to more accurately record the actual light load power consumption.

It is therefore an object of this invention to provide a compensation device for a single stator network meter which will improve the accuracy of such meter at light loads.

It is a further object of this invention to provide a light load compensation device to an iron core reactor of a network meter which will adjust the light load registration of such meter to more accurately indicate the power consumed at light loads.

Briefly, this invention in one form is applied to a single stator network meter which is provided with a reactor connected in parallel with one of the current coils of such meter. To improve the light load registration of such meter, a compensation device is electromagnetically connected to the reactor, bridging an air gap thereof, to thereby increase the impedance of such reactor at light loads and thereby improve the registration of the meter at light load.

The invention which it is desired to protect, will be particularly pointed out and distinctly claimed in the claims appended to this application. However, it is believed that the invention and the manner in which its various objects and advantages are obtained, as well as other objects and advantages thereof, will be better understood from the following description, when taken in connection with the accompanying drawings in which:

FIGURE 3 is a plan view of a single lamination used to make the reactor utilized in the network meter shown in FIGURE 1;

FIGURE 4 is a perspective view of the iron core reactor utilized in the meter of FIGURE 1, showing the invention in one form applied to such reactor; and FIGURE 5 is a partial sectional view, taken on the lines 5—5 of FIGURE 4, showing one form of this invention in greater detail.

Figure 1:
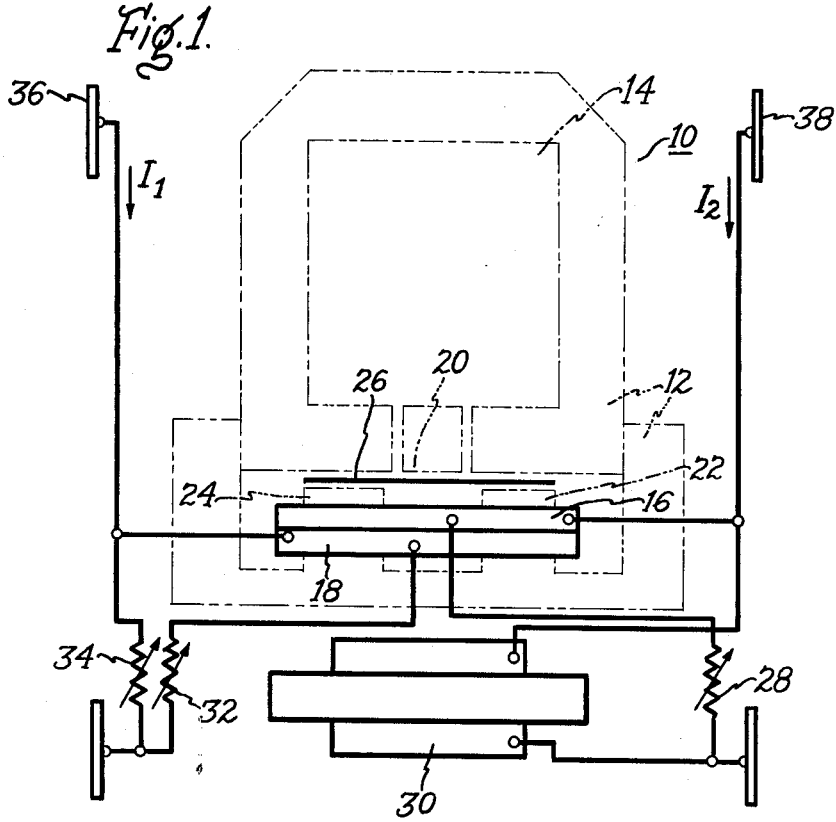
FIGURE 1 is a schematic representation of the structural arrangement of a single stator network meter.

Reference will now be made to the drawing for a detailed description of this invention, wherein like numerals are used to indicate like parts throughout. Consideration will first be given to FIGURE 1, which is a schematic representation of a single stator network meter as described in Patent 3,150,317. As shown in FIGURE 1, the meter 10 comprises a core structure 12 supporting the voltage coil 14 and the current coils 16 and 18. As will be apparent from FIGURE 1, the upper half of the core structure 12 and the voltage coil 14 comprise the voltage electromagnet which includes the pole 20. Of course, the lower half of the core structure and the current coils 16 and 18 comprise the current electromagnet, including the poles 22 and 24. Between poles 20 of the voltage electromagnet and the poles 22 and 24 of the current electromagnet is an air gap in which the induction disk 26 may rotate, being driven by the flux from the electromagnets in a manner well known to those skilled in this art.

In the manner explained in Patent 3,150,317, each of the current coils 16 and 18 is provided with a phase shifting network, the network with the current coil 16 being provided with a variable resistor 28 in series with the coil 16, and an iron core inductor or reactor 30 in parallel with the coil 16 and the resistor 28. The other phase shifting network comprises the coil 18 with variable resistor 32 in series therewith, and a second variable resistor 34 in parallel with the coil 18 and the resistor 32. As will be understood, terminal 36 represents one phase of a three-phase source having the line current $I_1$ flowing therein, while the terminal 38 represents another phase of such three-phase source with the current $I_2$ flowing in such phase. In a well known manner, at unity power factor the current $I_1$ leads the voltage between such phase lines, while the current $I_2$ lags this voltage. By use of the above-described phase shifting networks, the current through the current coils 16 and 18 are brought into the proper phase relation with each other and with the voltage.

According to the invention described in Patent 3,150,-317, the iron core inductor 30 in parallel with the current coil 16 has a comparatively low impedance, which provides a balanced phase shifting circuit having relatively small losses compared to previous meters. However, this low impedance is especially pronounced at light loads due to the low permeability of the core iron of the iron core reactor 30 at low flux densities. This causes the meter 10 to be inherently slow at light loads, as can be seen from the curves of FIGURE 2.

Figure 2:
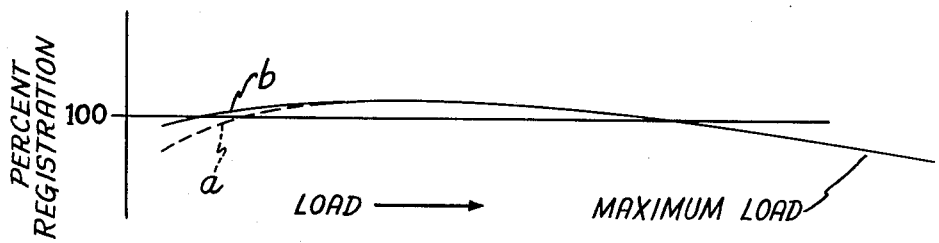
FIGURE 2 is a pair of curves representing the registration performance of the meter of FIGURE 1, with and without the light load compensation device according to this invention.

Referring now to FIGURE 2, the curve $a$ indicates the percent registration of the meter 10 without any compensation. As can be seen, the dotted portion of curve $a$ shows the slowness of the meter 10 at light loads. Of course, it will be understood, that it is desirable to have the meter 10 register as close to the 100% registration line as is possible. By use of the light load compensation device of this invention, the inductance of the iron core inductor 30 can be increased at light loads, giving the registration curve which is shown in FIGURE 2 at $b$. The improvement in registration will be readily apparent from a consideration of FIGURE 2. Also, as can be seen from FIGURE 2, the light load compensation device of this invention has no appreciable affect on the registration curve beyond the light load area. This is shown by merging of curves $a$ and $b$ at the low end of the registration curve. Thus from a consideration of FIGURE 2, it can be seen that the light load compensation device of this invention provides for an improved registration of the meter 10 at light loads, while at the same time, not affecting the overall registration of the meter 10 over substantially the major portion of the load registration curve.

Reference will now be made to FIGURES 3 through 5 of the drawings for a detailed description of the light load compensation device of this invention, and the manner of applying such compensation device to the iron core inductor 30 of the network meter 10. The iron core reactor 30 comprises a plurality of laminations 40, which may be of any desired shape, being provided with at least one air gap. The preferred shape is as shown in FIGURE 3. FIGURE 3 shows a single lamination 40, which comprises an outer portion 40a and a central portion 40b, being separated from the portions 40a by air gaps 40c. As can be seen, the central portion 40b is completely free of the outer portion of the lamination 40a in this preferred embodiment with the air gaps 40c being provided at each end. Of course, it will be understood that laminations 40 can be provided with only a single air gap 40c, if desired, with one end of portion 40b connected to the outer portion 40a. As will be understood, in the preferred embodiment, the laminations 40 are bound together by means of rivets through the holes 40d, preferably in the corners of the outer portion 40a, and in the air gaps 40c.

Referring now to FIGURE 4, the inductor 30 is shown as comprising a plurality of laminations 40 with a coil 42 wound about the center leg thereof. The laminations 40 are held together by means of rivets 44 which extend through the openings in the corners of the laminations 40. The laminated portions forming the center leg, indicated as 40b in FIGURE 3, are held to the outer laminations of and to each other by means of the rivets 46, which extend through the air gaps 40c. As will be understood, the inductor 30 is designed to change reactance with load, which helps to produce the optimum load curve desired for the meter 10. By the proper selection of the number of turns of the inductor, the dimensions of the air gap or gaps, the material used for the laminations, the number of laminations, and the overall dimensions of the core, the rate and degree of change of reactance may be controlled. However, as hereinbefore mentioned, due to the low permeability of the iron core of the inductor 30 at the low flux densities during light loads, the meter tends to be slow at such light loads. Of course it will be understood, that this is especially true for the line-to-neutral loads on the leading phase and, also, to a somewhat lesser degree, with the line-to-line loads which are involved in both of the phase shifting networks.

In order to reduce the effect of the low permeability of the iron core at the low flux densities, the light load compensation device, according to this invention, is applied to the inductor 30. In the form of the invention as shown in FIGURES 4 and 5, the light load compensation device takes the form of a thin washer 48, which is electromagnetically connected to one of the air gaps of the iron core inductor 30. The washer 48 is preferably of a material which has a very high magnetic permeability at low flux densities, for example, a moly-permalloy or Hy-mu 80. This washer is attached to the reactor in the manner shown in FIGURE 5, such that it bridges the air gap 40c.

As can be seen from FIGURE 5, which is a partial sectional view through the center of the reactor 30, the washer 48 is held bridging the air gap 40c by means of the rivet 46 which holds the central portion 40b of the laminations 40 to the remainder of the laminations 40a. In the preferred form of this invention, the rivet 46 is non-magnetic and the washer 48 is held in contact with the upper lamination 40. As can be understood, by means of the washer 48 with a high magnetic permeability at low flux densities, the impedance of the reactor increases at low values of currents when the flux density in the reactor core is low. However, since the washer 48 is of very small cross section compared to the iron core, comprised of laminations 40, of reactor 30, it will saturate as the load current increases and, as indicated, at curves $a$ and $b$ of FIGURE 2, will have very little affect on the registration curve of the meter at rated loads and above. Of course, it will be readily understood, that the size of the washer 48 and its permeability will be such as to improve the percent registration curve at light loads in the manner shown in FIGURE 2. Under certain circumstances of the network stator meter, it may, of course, be desirable to provide a washer 48 bridging both of the air gaps 40c of the various laminations 40 to provide for an increased impedance of the reactor at the low values of load currents with low flux density in the reactor core.

As heretofore pointed out, inasmuch as the design of the reactor 30 will depend upon the desired reactance change to provide the optimum load curve for the meter 10, the light load compensation device 48 of this invention will also be applied in order to obtain the most advantageous light load registration according to the curve of FIGURE 2. Obviously, under some circumstances, this will better be obtained by the use of a high permeability washer being provided over each of the air gaps 40c of the laminations 40. Thus it will be understood that the invention set forth in this application provides for a light load compensation device which will bridge one or both of the air gaps in the iron core reactor 30 to provide the most desirable light load registration curve.

From the above it will be apparent that, by means of the light load compensation device of this invention, that the light load registration curve of the network meter 10 has been increased and brought more closely into alignment with the 100% registration curve of the meter. Thus it can be seen that the light load compensation device of this invention performs all of the desired objects which have been set forth for this invention.

While the present preferred embodiment has been described in detail in this specification, it will of course be understood, that various changes may be made in the construction and in the materials of the reactor and the light load compensation device without departing from the spirit and scope of this invention, as set forth in the appended claims.

What is claimed as new and which it is desired to secure by Letters Patent of the United States is:

1. In a network meter having voltage and current electromagnets and an induction disk journaled for rotation between said electromagnets wherein the current electromagnet has a first current coil having a variable resistor in series therewith and a second variable resistor in parallel with said coil and said first variable resistor, and a second current coil having a variable resistor in series with said second current coil and an iron core inductor coil, having an air gap in the core, in parallel with said second coil and said variable resistor, a light load compensating device comprising a saturable electromagnetic washer of high magnetic permeability at low flux density, said washer being of relatively small cross-section compared to the cross-section of the iron core of said inductor and bridging the air gap in the iron core to thereby increase the impedance of said inductor at low values of load current to thereby increase the registration of said meter at light loads, said washer saturating at values of load current greater than light load so as to have substantially no effect on the meter registration at load currents greater than light load.

2. In a network meter having voltage and current electromagnets and an induction disk journaled for rotation between said electromagnets wherein the current electromagnet has a first current coil having a variable resistor in series therewith and a second variable resistor in parallel with said coil and said first variable resistor, and a second current coil having a variable resistor in series with said second current coil and an iron core inductor coil, having an air gap in the core in parallel with said second coil and said variable resistor, the improvement which comprises a light load compensating device in the form of a saturable high permeability magnetic means of relatively small cross-section compared to the cross-section of the iron core of said inductor and bridging said air gap of said inductor core to thereby increase the impedance of said inductor at low values of load current when the flux density of the reactor is low to thereby improve the registration of said meter at light loads, said magnetic means saturating at values of load current greater than light load so as to have substantially no effect on the meter registration at load current greater than light load.

3. A network meter as claimed in claim 2 in which said core of said iron core inductor has a plurality of air gaps and in which said light load compensating device comprises at least one saturable high permeability magnetic washer bridging at least one of said air gaps.

References Cited by the Examiner

UNITED STATES PATENTS

| | | | |
|---|---|---|---|
| 1,897,040 | 2/33 | Christopher | 336—178 |
| 1,982,344 | 11/34 | Kinnard | 324—117 |
| 2,445,088 | 7/48 | Schilling | 336—160 |
| 2,562,693 | 7/51 | Brooks | 336—210 |
| 2,930,979 | 3/60 | Clarke | 324—107 |

WALTER L. CARLSON, *Primary Examiner.*

BENNETT G. MILLER, *Examiner.*